United States Patent Office 3,720,698
Patented Mar. 13, 1973

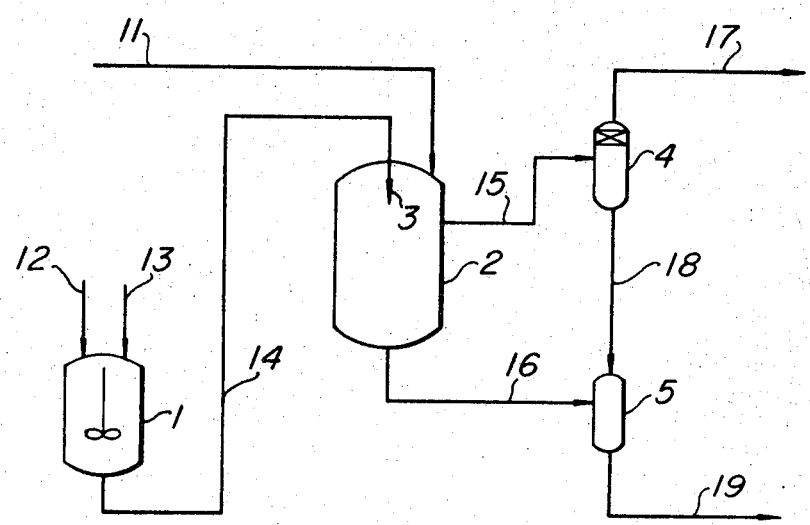

3,720,698
PROCESS FOR PRODUCING TRIALKOXY-
ALUMINUM
Eiichi Ichiki, Kazuo Iida, Michio Kozai, and Yoshihiro
Kondo, Niihama, Japan, assignors to Sumitomo Chemical Company, Limited, Osaka, Japan
Filed June 7, 1971, Ser. No. 150,565
Claims priority, application Japan, June 10, 1970,
45/50,663
Int. Cl. C07f 5/06
U.S. Cl. 260—448 AD                13 Claims

ABSTRACT OF THE DISCLOSURE

A trialkoxyaluminum is produced from an alkylaluminum compound,

wherein $R_1$ represents an alkyl group having 2–30 carbon atoms and $R_2$ and $R_3$ represent alkyl groups or alkoxy groups having 2–30 carbon atoms through oxidation by introducing the alkylaluminum compound diluted with at least 600 g. of a solvent having a boiling point of $-50°$–$150°$ C. and being substantially inert to the alkylaluminum compound, per gram equivalent of alkyl groups of the alkylaluminum compound, into a molecular oxygen-containing gas under a partial pressure of oxygen of at least 0.1 kg./cm.$^2$ absolute at a temperature of $-20°$–$150°$ C., preferably $0°$–$100°$ C. under a pressure of not more than 50 kg./cm.$^2$ absolute, preferably 0.5–40 kg./cm.$^2$ absolute in a finely divided droplet state thereby to oxidize the alkylaluminum compound.

---

This invention relates to a process for producing a trialkoxyaluminum, and more particularly, the present invention relates to a process for producing trialkoxyaluminum by oxidizing an alkylaluminum compound.

The alkoxyaluminum compounds are a very important precursors, because they are converted to useful alcohols as a solvent, plasticizer, detergent, lubricant, etc. by hydrolysis.

It is well-known that an oxidation reaction of trialkylaluminum by molecular oxygen proceeds stagewise as shown below:

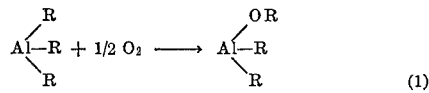
(1)

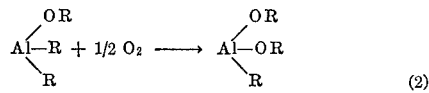
(2)

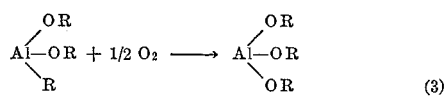
(3)

wherein R represents an alkyl group.

The reactions as represented by said Formulae 1 and 2 very vigorously proceed and release a large amount of heat. Therefore, undesirable side reactions are ready to take place, whereby the alkyl groups are converted to olefins and paraffins.

On the other hand, the reaction represented by the Formula 3 very slowly proceeds, contrary to the reactions represented by the Formulae 1 and 2, and it is very difficult to complete the reaction and undesirable side reactions are much ready to take place whereby the alkyl groups are converted to olefins and paraffins.

Therefore, when the reactions are carried out at a controlled temperature to prevent the side reactions taking place together with the reactions (1), (2) and (3), it is difficult to complete the reaction (3). On the other hand, when a higher temperature is employed to complete the reaction (3), the side reactions take place remarkably at the reactions (1), (2) and (3). That is, there has been a contradicting problem in carrying out the reactions.

To overcome such a problem, there have been so far proposed a process which comprising oxidizing the alkylaluminum compound with molecular oxygen diluted with a large amount of inert gas at the initial stage of the reaction, increasing an oxygen concentration of the gas with a progress of the reaction and using pure oxygen at the last stage of the reaction to complete the reaction (Japanese patent publication No. 9,881/58), and a process which comprises blowing an oxygen-containing gas into a mixture of at least 80% by weight of inert hydrocarbon and trialkylaluminum thereby to accelerate the reaction (U.S. Pat. No. 2,863,895).

However, the occurrence of the side reactions cannot be completely prevented and the reaction cannot be completed within a short time by either process. Furthermore, in either process, there is such a disadvantage that the yield of trialkoxyaluminum cannot be made higher than 90%.

Under these situations, the present inventors have made various studies on a process for producing a trialkoxyaluminum by oxidizing an alkylaluminum compound with molecular oxygen, and as a result have found a novel process for producing a trialkoxyaluminum where the occurrence of the undesirable side reactions can be completely prevented, the reaction can be completed within a very short time and the conversion of the alkylaluminum compound can be attained about 95% or more.

That is to say, an object of the present invention is to provide a process for producing a trialkoxyaluminum from an alkylaluminum compound by oxidation, which comprises introducing an alkylaluminum compound diluted with at least 600 g. of a solvent having a boiling point of $-50°$–$150°$ C. and being substantially inert to the alkylaluminum compound, per gram equivalent of alkyl groups of the alkylaluminum compound, into a molecular oxygen-containing gas in a finely divided droplet state thereby to oxidize the alkylaluminum compound.

The alkylaluminum compound used in the present invention as a starting material is represented by the general formula,

wherein $R_1$ represents an alkyl group having 2–30 carbon atoms, and $R_2$ and $R_3$ represent alkyl or alkoxy groups having 2–30 carbon atoms.

Examples of the alkylaluminum compounds include tributylaluminum, tripentylaluminum, trihexylaluminum, trioctylaluminum, tridecylaluminum, tridodecylaluminum, trihexadecylaluminum and the partially oxidized ones of these alkylaluminum compounds. However, a maximum effect can be expected when a trialkylaluminum is used as the starting material.

As the starting material, alkylaluminum compounds can be used alone or in a mixture.

The solvent which used for diluting the alkylaluminum compound in the present invention are compounds which have a boiling point of $-50°$–$150°$ C. and are substantially inert to the alkylaluminum compound. The reason why the boiling point of a solvent is restricted to a range of $50°$–$150°$ C. is that a higher pressure is required for liquefying a solvent when the solvent has a boiling point below −50° C., and on the other hand, when a solvent has a boiling point above 150° C., it is difficult to remove the heat of reaction by evaporation of the solvent, and as a result the reaction temperature increases and the side reaction cannot be prevented.

Examples of the solvent include paraffins such as propane, butane, pentane, hexane and heptane; cycloparaffins such as cyclobutane, cyclopentane and cyclohexane; olefins such as propylene, butene and hexene; cycloolefins such as cyclopentene and cyclohexene; aromatic hydrocarbons such as benzene and toluene; ethers; compounds containing divalent sulfur atom such as thiophene or trivalent nitrogen such as pyridine or phosphorus atom such as trimethylphosphine; non-reactive halogenated hydrocarbons such as ethyl chloride; mixtures of these compounds. However, hydrocarbons such as propane, butane, a butane-butene mixture, pentane, hexane and heptane are particularly preferably used in the present invention.

As to the amount of the solvent used to dilute the alkylaluminum compound, generally at least about 600 g. of the solvent, particularly preferably 700–20,000 g. thereof, can be used per gram equivalent of the alkyl groups of the starting alkylaluminum compound. When less than 600 g. of the solvent is used per gram equivalent of the alkyl groups of the alkylaluminum compound, it is difficult to control the reaction temperature and the occurrence of the side reactions cannot be prevented. When more than 20,000 g. of the solvent is used per gram equivalent of the alkyl groups of the alkylaluminum compound, the process is not economical.

As the molecular oxygen-containing gas, oxygen, oxygen gas diluted with inert gases such as nitrogen and argon, or hydrocarbons such as propane and butane, air or the like is used in the present invention.

The alkylaluminum compound, solvent and molecular oxygen are supplied into an oxidation reactor in the present invention in any of the following manners. That is, for example, one procedure is such that a solution mixture of the alkylaluminum compound and the solvent, which has been well mixed in advance, is supplied into the reactor in a finely divided droplet state by a spray nozzle or other means for finely dividing a liquid into droplets usually employed, while the oxygen is supplied thereto from another conduit pipe. Another procedure is the supply based on the so-called two-fluid atomizer, where the solution mixture of the alkylaluminum compound and the solvent are finely divided into droplets by a molecular oxygen-containing gas. Other procedure is the supply based on the so-called three-fluid atomizer, where the alkylaluminum compound and the solvent are individually supplied to one and same nozzle and further are finely divided into droplets by a molecular oxygen-containing gas. By oxidizing the alkylaluminum compound in a finely divided droplet state in this manner, the reaction can be completed within a very short time, and the conversion of the alkylaluminum compound to trialkoxyaluminum can be about 95% or more effected.

The raw materials can be supplied to the oxidation reactor from one position or a plurality of positions.

In the present invention, partial pressure of oxygen in the oxidation reactor is usually at least 0.1 kg./cm.² absolute, but when the partial pressure of oxygen is higher, the reaction can be effectively carried out in a shorter time, and therefore it is desirable to make a partial pressure of oxygen as high as possible.

The oxidation reaction can be carried out usually at a temperature of −20°–150° C., but preferably at a temperature of 0°–100° C. When the reaction temperature is less than −20° C., the reaction rate is lower, whereas when the reaction temperature exceeds 150° C., the side reactions take place. Therefore, the reaction temperature beyond the range of −20°–150° C. is not preferable.

The oxidation reaction is usually carried out under 50 kg./cm.² absolute or less. However, the productivity is lower under a pressure of near 0 kg./cm.² absolute, whereas the reaction pressure exceeds 50 kg./cm.² absolute, the evaporation of the solvent becomes difficult and the reaction temperature increases, whereby the occurrence of the side reactions cannot be prevented. Therefore, the desirable reaction pressure is 0.5–40 kg./cm.² absolute in the present invention.

The reaction pressure depends upon the solvent used, the reaction temperature, etc., but it is desirable to employ a higher reaction pressure when a solvent having a lower boiling point, for example, propane, is used, and to employ a lower reaction pressure when a solvent having a higher boiling point, for example, xylene, is used.

The thus obtained trialkoxyaluminum is an alkoxyaluminum compound having alkoxy groups corresponding to the alkyl groups of the starting material used, and is represented by the general formula:

wherein —OR$_1$, —OR$_2$ and —OR$_3$ represent the alkoxy groups having 2–30 carbon atoms.

The examples of the thus obtained trialkoxyaluminum include tributoxyaluminum, tripentoxyaluminum, trihexoxyaluminum, trioctoxyaluminum, tridecyloxyaluminum, tridodecyloxyaluminum, and trihexadecyloxyaluminum or their mixtures.

The thus obtained trialkoxyaluminum is then hydrolyzed, for example, with water, sulfuric acid, or sodium hydroxide thereby to produce the corresponding alcohol.

The thus obtained alcohol can be effectively utilized as a solvent, plasticizer, detergent, lubricant, etc.

Now, the present invention will be explained, referring to the drawing.

The accompanying drawing shows one example of a flow diagram suitable for carrying out the present invention. The present invention is never limited to the flow diagram shown in the drawing.

An alkylaluminum compound is supplied to a raw material mixer 1 from a conduit 12, and a solvent thereto from a conduit 13. In the raw material mixer 1, the alkylaluminum compound and the solvent are mixed and then supplied to an oxidation reactor 2 through a conduit 14. In the oxidation reactor 2, the mixture of the alkylaluminum compound and the solvent are finely divided into droplets by a suitable means 3 for finely dividing a liquid into droplets, and are subjected to oxidation reaction. A molecular oxygen-containing gas is supplied to the oxidation reactor 2 through a conduit 11.

The thus formed trialkoxyaluminum is withdrawn from the bottom of the oxidation reactor 2 to a product reservoir 5 through a conduit 16.

The solvent vapor generated by the reaction, unreacted molecular oxygen, and sometimes reaction residue gas containing the inert gas are led to a mist catcher 4 through a conduit 15, where fine liquid droplets of trialkoxyaluminum contained in the gas are collected, and the thus collected trialkoxyaluminum is led to the product reservoir 5 through a conduit 18. The solvent vapor and unreacted molecular oxygen free from the mists of trialkoxyaluminum, and sometimes the gas containing the inert gas are withdrawn to the outside of the reaction system through a conduit 17. The residue gas may be then recycled to the oxidation reactor 2 or purged to the outside of the system after the solvent is recovered therefrom by condensation.

A solution mixture of the thus formed trialkoxyaluminum and the solvent is led to a successive step, for example, a stripping step or hydrolysis step, from the product reservoir 5 through a conduit 19.

According to the present invention as explained in detail above, the following remarkable advantages can be obtained:

(1) Considerably high conversion by oxidation can be attained.

(2) Occurrence of undesirable side reactions can be completely prevented.

(3) Time for oxidation reaction can be much shortened.

(4) Reaction conditions can be very readily controlled.

Now, the present invention will be explained, referring to examples, but the scope of the present invention is not limited to the examples.

EXAMPLE 1

A gas consisting of 30% by volume of a butane-butene mixture and 70% by volume of air, which had been dried in advance, was filled under a pressure of 7.0 kg./cm.$^2$ absolute in a reactor vessel having an inner diameter of 1.16 m. and a height of 2.4 m., and a raw material mixture consisting of 8.7% by weight of tri-2-ethylhexylaluminum, 90.3% by weight of dried butane-butene mixture and 1.0% by weight of 2-ethylhexene-1 was supplied into the reactor vessel at a rate of 8.4 l./hr. while finely dividing the raw material by a hollow-cone spray nozzle having orifice diameter of 0.5 mm., which was provided at the top of the reactor vessel. On the other hand, at the same time when the raw material was started to supply, dry air was supplied to the reactor vessel at a rate of 2.7 Nm.$^3$/hr. from another conduit fixed to the reactor vessel to effect reaction. A temperature within the reactor vessel was 9° C.

The reaction residue gas was withdrawn from the reaction vessel through a mist catcher, while keeping the pressure of the reactor vessel at 7.0 kg./cm.$^2$ G.

The liquid was continuously withdrawn from the bottom of the reactor vessel to a product reservoir. Off gas of the reactor vessel was successively analyzed from the start of the reaction, and when the off gas composition became constant, a product was sampled out of the bottom of the reactor vessel. The dissolved butane-butene mixture was evaporated off the sample, and further olefins contained in the raw material and olefins and paraffins formed by the side reactions were evaporated off the sample in vacuum. Then, the residual sample liquid was hydrolyzed, and the thus obtained organic layer was analyzed. It was found that 97.0% of the alkyl groups of the starting alkylaluminum compound was converted to alkoxy groups. A portion of the off gas was sampled from a gas purge conduit and subcooled to —70° C. The resulting condensed liquid was analyzed. It was confirmed that there were no paraffins and olefins corresponding to the alkyl groups of the alkylaluminum compound.

EXAMPLE 2

The same apparatus as used in Example 1 was used. A mixture consisting of 8.8% by weight of tri-2-ethylhexylaluminum, 89.7% by weight of a butane-butene mixture and 1.5% by weight of 2-ethylhexene-1 was supplied at a rate of 8.4 l./hr. to a reactor vessel filled with a gas mixture consisting of 70% by volume of propane and 30% by volume of molecular oxygen in advance under a pressure of 4 kg./cm.$^2$ G, whereas a gas mixture consisting of 10.9% by volume of molecular oxygen and 89.1% by volume of propane was supplied to the reactor vessel at a rate of 1.7 Nm.$^3$/hr. from another conduit to start reaction. A temperature within the reactor vessel was 30° C.

After the reaction was brought into a stationary state, a liquid was sampled off the bottom of the reactor vessel. The dissolved propane and butane-butene mixture were evaporated off the sample and further the dissolved olefins and paraffins were separated from the sample in vacuum. The resulting residual sample liquid was hydrolyzed and the thus obtained organic layer was analyzed. It was found that 95.5% of the alkyl groups of the starting alkyl-aluminum compound was converted to alkoxy groups.

EXAMPLE 3

The same reactor vessel as in Example 1 was used. As alkylaluminum compounds, a growth reaction product of ethylene was used and oxidized to alkoxyaluminum compounds by changing a capacity of a spray nozzle. The alkylaluminum compounds used had such a composition that the chain length of the alkyl groups was in accordance with the so-called Poisson distribution, as shown below:

| Alkyl group: | Percent by equivalent |
|---|---|
| $C_2$ | 0.7 |
| $C_4$ | 3.4 |
| $C_6$ | 8.6 |
| $C_8$ | 12.3 |
| $C_{10}$ | 18.0 |
| $C_{12}$ | 17.9 |
| $C_{14}$ | 14.9 |
| $C_{16}$ | 10.7 |
| $C_{18}$ | 6.7 |
| $C_{20}$ | 3.7 |
| $C_{22}$ | 1.8 |
| $C_{24}$ | 0.8 |
| $C_{26}$ | 0.5 |

18.2% by weight of the alkylaluminum compounds having the above composition and 81.8% by weight of propane were mixed together in advance and supplied into the reactor vessel through a hollow-cone spray nozzle having orifice diameter of 2.0 mm., which was fixed to the top of the reactor vessel, at a rate of 120 l./hr., the reactor vessel being filled with a gas mixture of propane and molecular oxygen under a pressure of 25.0 kg./cm.$^2$ G. At the same time when the solution mixture was started to supply, a gas consisting of 40% by volume of molecular oxygen and 60% by volume of propane was supplied to the reactor vessel at a rate of 3.63 Nm.$^3$/hr. to start reaction. A temperature within the reactor vessel was 50° C. The residue gas was withdrawn from the reactor vessel, while keeping the pressure of the reactor vessel constant. Off gas was successively analyzed, and after the composition of the off gas became constant, a sampling of a product liquid was carried out, and the sample was analyzed. It was found that 97.5% of the raw material Al(C$_6$H$_{13}$)$_3$ was converted to Al(OC$_6$H$_{13}$)$_3$, and 96.0% of the raw material Al(C$_{16}$H$_{33}$)$_3$ to Al(OC$_{16}$H$_{33}$)$_3$.

EXAMPLE 4

The same apparatus as in Example 1 was used. A mixture of an alkylaluminum compound and a solvent, and molecular oxygen were supplied to the reactor vessel through a two-fluid atomizer to carry out oxidation reaction of the alkylaluminum compound.

As the alkylaluminum compound, tri-2-ethylhexylaluminum was used. As the solvent, a solution mixture consisting of 55% by weight of n-pentane and 45% by weight of n-heptane was used. 9.7% by weight of tri-2-ethylhexylaluminum was added in advance to the solvent and mixed, and then resulting alkylaluminum solution and the molecular oxygen were supplied to the reactor vessel from the two-fluid atomizer. The reactor vessel was kept to an atmospheric pressure with a nitrogen gas in advance, and after the solution and the gas were started to supply, the reaction residue gas was withdrawn from the reactor vessel, while keeping the reactor vessel under an atmospheric pressure. A temperature within the reactor vessel was 32° C. The feeding rate of the alkylaluminum was 12.8 l./hr. and that of the molecular oxygen gas was 7.50 Nm.$^3$/hr. After no nitrogen was observed in the off gas from the reactor vessel, a liquid was sampled off a bottom of the reactor vessel and analyzed. It was found that 97.0% of 2-ethylhexylaluminum was converted to 2-ethylhexoxyaluminum.

COMPARATIVE EXAMPLE

A solution consisting of 50% by weight of tri-2-ethylhexylaluminum and 50% by weight of heptane was supplied at a rate of 11 l./hr. to a jacketed bubble column type reactor having an inner diameter of 150 mm. and an inside capacity of 27.1 l. At the same time, dry air was supplied into the reactor from the bottom at a rate of 1.53 Nm.³/hr. to effect oxidation reaction. A reaction temperature was kept at 30° C. A liquid was withdrawn from the reactor, while keeping a liquid level constant within the reactor, and a gas was withdrawn from the top of the reactor, while keeping the reactor under an atmospheric pressure. After the reaction was brought into a stationary state, a liquid product was analyzed. It was found that 77.8% of the alkyl groups of the alkylaluminum compound was converted to the alkoxy groups, and 8.5% thereof was converted to olefins or paraffins, while 13.9% of unreacted alkyl groups were retained. Then, the thus formed alkylaluminum mixture was supplied at a rate of 10 l./hr. to a bubble column type reactor with a stirrer, the reactor having an inner diameter of 250 mm. and an inside capacity of 60 l., and dried molecular oxygen was supplied to the bottom of the reactor at a rate of 100 Nl./hr. A reaction temperature was kept at 30° C. The stirrer was of 8-stage, turbine type, and stirring was carried out at 95 r.p.m. After the reaction was brought into a sufficiently stationary state, a product liquid was sampled and analyzed. It was found that 81.2% of the raw material alkylaluminum compound was converted to alkoxyaluminum compound, and the remainings were by-produced paraffins and olefins, and unreacted alkylaluminum compound.

What is claimed is:

1. A process for producing a trialkoxyaluminum, which comprises introducing an alkylaluminum compound diluted with at least 600 g. of a solvent having a boiling point of −50° to +150° C. and being substantially inert to the alkylaluminum compound, per gram equivalent of alkyl groups of the alkylaluminum compound, in a finely divided droplet state into a molecular oxygen-containing gas thereby to oxidize the alkylaluminum compound.

2. A process according to claim 1, wherein the alkylaluminum compound is a compound having the formula,

wherein $R_1$ represents an alkyl group having 2–30 carbon atoms and $R_2$ and $R_3$ represent alkyl or alkoxy groups having 2–30 carbon atoms.

3. A process according to claim 2, wherein the alkylaluminum compound is tributylaluminum, tripentylaluminum, trihexylaluminum, trioctylaluminum, tridecylaluminum, tridodecylaluminum, trihexadecylaluminum or a partially oxidized one of said alkylaluminum compounds.

4. A process according to claim 3, wherein the alkylaluminum compound is used alone or in a mixture.

5. A process according to claim 1, wherein the solvent is propane, butane, pentane, hexane, heptane, cyclobutane, cyclopentane, cyclohexane, propylene, butene, hexene, cyclopentene, cyclohexene, benzene, toluene, ethers, thiophene, pyridine, trimethylphosphine or ethyl chloride alone or in a mixture.

6. A process according to claim 5, wherein the solvent is propane, butane, a butane-butene mixture, pentane, hexane or heptane.

7. A process according to claim 1, wherein 700–20,000 g. of the solvent is used per gram equivalent of alkyl groups of the alkylaluminum compound.

8. A process according to claim 1, wherein the molecular oxygen-containing gas is oxygen; oxygen dilute with nitrogen, argon, propane or butane; or air.

9. A process according to claim 1, wherein the oxygen is under a partial pressure of at least 0.1 kg./cm.² absolute.

10. A process according to claim 1, wherein the oxidation is carried out at a temperature of −20°–150° C.

11. A process according to claim 10, wherein the oxidation is carried out at a temperature of 0°–100° C.

12. A process according to claim 1, wherein the oxidation is carried out under a pressure of not more than 50 kg./cm.² absolute.

13. A process according to claim 12, wherein the oxidation is carried out under a pressure of 0.5–40 kg./cm.² absolute.

References Cited

UNITED STATES PATENTS

| | | | |
|---|---|---|---|
| 2,863,895 | 12/1958 | Kirshenbaum | 260—448 A D |
| 3,455,978 | 7/1969 | Richardson et al. | 260—448 A D |
| 3,042,696 | 7/1962 | Aldridge | 260—448 A D |
| 2,921,949 | 1/1960 | Kirshenbaum | 260—448 A D |
| 2,892,858 | 6/1959 | Ziegler | 260—448 A D |
| 2,873,290 | 2/1959 | Esmay et al. | 260—448 A D |

FOREIGN PATENTS

| | | | |
|---|---|---|---|
| 250,250 | 1965 | Japan | 260—448 A D |
| 9,881 | 1958 | Japan. | |
| 1,208,515 | 10/1970 | Great Britain | 260—448 A D |
| 930,970 | 7/1963 | Great Britain | 260—448 A D |

HELEN M. S. SNEED, Primary Examiner